United States Patent
Ahn et al.

(10) Patent No.: US 10,177,884 B2
(45) Date of Patent: Jan. 8, 2019

(54) METHOD AND DEVICE FOR PERFORMING HARQ FOR MULTI CELLS

(71) Applicant: LG ELECTRONICS INC., Seoul (KR)

(72) Inventors: Joonkui Ahn, Seoul (KR); Dongyoun Seo, Seoul (KR); Suckchel Yang, Seoul (KR); Seungmin Lee, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 19 days.

(21) Appl. No.: 15/117,049

(22) PCT Filed: Jan. 16, 2015

(86) PCT No.: PCT/KR2015/000467
§ 371 (c)(1),
(2) Date: Aug. 5, 2016

(87) PCT Pub. No.: WO2015/119387
PCT Pub. Date: Aug. 13, 2015

(65) Prior Publication Data
US 2016/0352472 A1 Dec. 1, 2016

Related U.S. Application Data

(60) Provisional application No. 61/949,260, filed on Mar. 7, 2014, provisional application No. 61/936,882, filed on Feb. 7, 2014.

(51) Int. Cl.
*H04L 1/18* (2006.01)
*H04L 5/00* (2006.01)
(Continued)

(52) U.S. Cl.
CPC .......... *H04L 1/1887* (2013.01); *H04L 5/0032* (2013.01); *H04L 5/0055* (2013.01);
(Continued)

(58) Field of Classification Search
CPC ... H04L 1/1887; H04L 1/0077; H04L 5/0032; H04L 5/0055; H04L 5/14; H04L 1/1814; H04W 72/042
See application file for complete search history.

(56) References Cited

U.S. PATENT DOCUMENTS 9,276,691 B2 * 3/2016 Choi ..................... H04J 3/1694
9,331,820 B2 * 5/2016 Park ..................... H04L 1/1861
(Continued)

FOREIGN PATENT DOCUMENTS

CN  103444118 A  12/2013
WO  WO 2013/162261 A1  10/2013

OTHER PUBLICATIONS

NEC, "HARQ timing for TDD-FDD CA", R1-135258, 3GPP TSG RAN WG1 Meeting #75, San Francisco, USA, Nov. 11-15, 2013, pp. 1-4.
(Continued)

*Primary Examiner* — Asad M Nawaz
*Assistant Examiner* — Thomas R Cairns
(74) *Attorney, Agent, or Firm* — Birch, Stewart, Kolasch & Birch, LLP (57) ABSTRACT

Provided are a method for performing a hybrid automatic repeat request (HARQ) of a frequency division duplex (FDD) cell in a wireless communication system and a wireless device using the same. The wireless device receives an uplink-downlink (UL-DL) configuration for an uplink (UL) carrier of the FDD cell, and performs the HARQ in a DL carrier of the FDD cell on the basis of HARQ timing determined according to the UL-DL configuration.

12 Claims, 7 Drawing Sheets

(51) Int. Cl.
  *H04L 5/14* (2006.01)
  *H04W 72/04* (2009.01)
  *H04L 1/00* (2006.01)

(52) U.S. Cl.
  CPC .............. *H04L 5/14* (2013.01); *H04W 72/042* (2013.01); *H04L 1/0077* (2013.01)

(56) References Cited

U.S. PATENT DOCUMENTS

| | | | |
|---|---|---|---|
| 2013/0070690 A1* | 3/2013 | Moon | H04L 5/001 370/329 |
| 2013/0343239 A1 | 12/2013 | Damnjanovic et al. | |
| 2015/0055521 A1 | 2/2015 | Seo et al. | |
| 2015/0124670 A1* | 5/2015 | Park | H04L 1/1671 370/281 |

OTHER PUBLICATIONS

Potevio, "Discussion on PUSCH timing in TDD-FDD CA", R1-135443, 3GPP TSG RAN WG1 Meeting #75, San Francisco, USA, Nov. 11-15, 2013, pp. 1-4.

Qualcomm Incorporated, "Solutions for TDD-FDD CA", R1-135301, 3GPP TSG RAN WG1 #75, San Francisco, CA, USA, Nov. 11-15, 2013, pp. 1-7, and figures 5, 6.

* cited by examiner

METHOD AND DEVICE FOR PERFORMING HARQ FOR MULTI CELLS

CROSS REFERENCE TO RELATED APPLICATIONS

This application is the National Phase of PCT International Application No. PCT/KR2015/000467, filed on Jan. 16, 2015, which claims priority under 35 U.S.C. 119(e) to U.S. Provisional Application No. 61/936,882, filed on Feb. 7, 2014, and 61/949,260 filed on Mar. 7, 2014, all of which are hereby expressly incorporated by reference into the present application.

BACKGROUND OF THE INVENTION

Field of the Invention

The present invention relates to wireless communications, and more particularly, to a method for performing a hybrid automatic repeat request (HARQ) in a wireless communication system, and an apparatus using the method.

Related Art

Long term evolution (LTE)/-LTE-Advanced (LTE-A) based on 3rd generation partnership project (3GPP) technical specification (TS) releases 8-11 are widely employed mobile communication standard. Recently, next-generation mobile communication with higher efficiency is under standardization.

In a communication system, a duplex scheme includes a time division duplex (TDD) and a frequency division duplex (FDD). The TDD provides an uplink communication and a downlink communication in the same frequency band. The FDD provides the uplink communication and the downlink communication in different frequency bands.

A carrier aggregation (CA) is a technique capable of providing a plurality of component carriers to the UE. Each component carrier may be defined as one cell. When the plurality of component carriers is configured for the UE, the UE may receive services from a plurality of serving cells.

Each serving cell may be configured with the FDD or the TDD. In a carrier aggregation environment, the UE may be configured with a plurality of duplex schemes. For example, if two cells are configured for the UE, the cells may be configured as a TDD cell-TDD cell or a TDD cell-FDD cell. Accordingly, a throughput of the UE may be increased in various network environments.

However, since a plurality of duplex schemes is applied to the UE, there may be a problem in an operation for the downlink communication and the uplink communication.

SUMMARY OF THE INVENTION

The present invention relates to a method for performing a hybrid automatic repeat request (HARQ) for a frequency division duplex (FDD) cell in a wireless communication system, and a wireless device using the method.

In an aspect, a method for performing a hybrid automatic repeat request (HARQ) of a frequency division duplex (FDD) cell in a wireless communication system is provided. The method includes receiving, by a wireless device, an uplink-downlink (UL-DL) configuration for a UL carrier of the FDD cell, and performing, by the wireless device, the HARQ in a DL carrier of the FDD cell based on an HARQ timing determined according to the UL-DL configuration.

The performing of the HARQ may comprise receiving a DL transport block in a DL subframe n−k of the DL carrier of the FDD cell, and transmitting an ACK/NACK for the DL transport block in a UL subframe n of the UL carrier of the FDD cell. The values n and k may be integers satisfying n, k>=0, and the value k may be determined according to the UL-DL configuration.

In another aspect, a device for performing a hybrid automatic repeat request (HARQ) in a wireless communication system is provided. The device includes a radio frequency (RF) unit configured to transmit and receive a radio signal, and a processor operatively coupled to the RF unit and configured to receive an uplink-downlink (UL-DL) configuration for a UL carrier of a frequency division duplex (FDD) cell by using the RF unit, and determine the HARQ in a DL carrier of the FDD cell based on the UL-DL configuration by using the RF unit.

A timing for performing a hybrid automatic repeat request (HARQ) is proposed to support time division duplex (TDD) also in a frequency division duplex (FDD) cell.

DESCRIPTION OF EXEMPLARY EMBODIMENTS

A wireless device may be fixed or mobile, and may be referred to as another terminology, such as a user equipment (UE), a mobile station (MS), a mobile terminal (MT), a user terminal (UT), a subscriber station (SS), a personal digital assistant (PDA), a wireless modem, a handheld device, etc. Alternatively, the wireless device may be a device supporting a data communication such as a machine-type communication (MTC) device.

A base station (BS) is generally a fixed station that communicates with the wireless device, and may be referred to as another terminology, such as an evolved-NodeB (eNB), a base transceiver system (BTS), an access point, etc.

It is described hereinafter that the present invention is applied based on 3rd generation partnership project (3GPP) long term evolution (LTE)/LTE-advanced (LTE-A) based on 3GPP TS releases 8-11. This is for exemplary purposes only, and the present invention is also applicable to various wireless communication systems. In the following description, LTE and/or LTE-A are collectively referred to as LTE.

A wireless device may be served by a plurality of serving cells. Each serving cell may be defined by a downlink (DL) component carrier (CC) or a pair of a DL CC and an uplink (UL) CC.

A serving cell may be classified into a primary cell and a secondary cell. The primary cell operates at a primary frequency, performs an initial connection establishment procedure, initiates a connection reestablishment procedure or is designated as a primary cell during a handover. The primary cell may be referred to as a reference cell. The secondary cell operates at a secondary frequency and is configured after establishing a radio resource control (RRC) connection. The secondary cell is used to provide additional radio resources. At least one primary cell is always configured but the secondary cell may be added/modified/released by a upper layer signaling (e.g. RRC message).

A cell index (CI) of the primary cell may be fixed. For example, lowest CI may be set as the CI of the primary cell. Hereinafter, the CI of the primary cell is set to zero and the CI of a secondary cell may be assigned subsequently starting from one.

Figure 1:
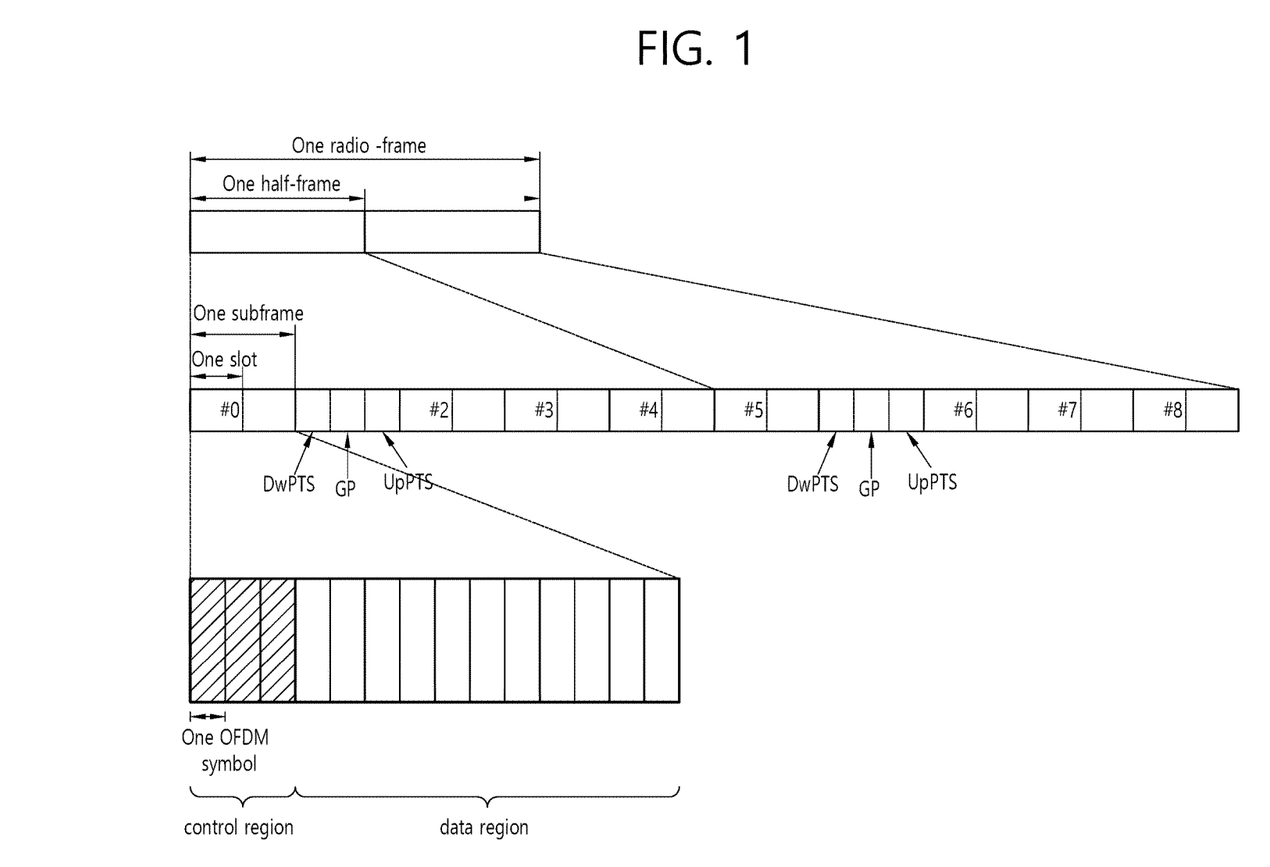
FIG. 1 shows a structure of a downlink radio frame in 3rd generation partnership project (3GPP) long term evolution (LTE).

FIG. 1 shows a structure of a downlink radio frame in 3GPP LTE-A. The section 6 of 3GPP TS 36.211 V11.2.0 (2013 February) "Evolved Universal Terrestrial Radio Access (E-UTRA); Physical Channels and Modulation (Release 10)" may be incorporated herein by reference.

A radio frame includes 10 subframes indexed with 0 to 9. One subframe includes 2 consecutive slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V10.2.0, in case of a normal CP, one slot includes 7 OFDM symbols, and in case of an extended CP, one slot includes 6 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB can include 7×12 resource elements (REs).

Subframes having indexes #1 and #6 are called as special (S) subframes. A S subframe may include a downlink pilot time slot (DwPTS), a guard period (GP) and a uplink pilot time slot (UpPTS). The DwPTs may be used for initial cell search, synchronization and channel estimation. The UpPTS may be used for channel estimation at a BS, uplink synchronization at a wireless device. The GP, also called as a gap, may be a duration to mitigate uplink interference due to multi-path delay of a downlink signal between downlink and uplink.

In TDD, a subframe may be a DL subframe or a UL subframe. Table 1 shows an example of radio frame configuration.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL subframe, 'U' denotes a UL subframe and 'S' denotes a S subframe. When a UL-DL configuration is received from a BS, a wireless device can know which subframe is a DL subframe or a DL subframe in accordance with the UL-DL configuration.

A DL subframe is divided into a control region and a data region in the time domain. The control region includes up to first three OFDM symbols of a 1st slot in the subframe. However, the number of OFDM symbols included in the control region may vary. A physical downlink control channel (PDCCH) and other control channels are allocated to the control region, and a physical downlink shared channel (PDSCH) is allocated to the data region.

DL control channels are described as follows.

As disclosed in 3GPP TS 36.211 V11.2.0, the 3GPP LTE/LTE-A classifies a physical control channel into a physical downlink control channel (PDCCH), a physical control format indicator channel (PCFICH) and a physical hybrid-ARQ indicator channel (PHICH).

The PCFICH transmitted in a 1st OFDM symbol of the subframe carries a control format indicator (CFI) regarding the number of OFDM symbols (i.e., a size of the control region) used for transmission of control channels in the subframe. The LIE first receives the CFI on the PCFICH, and thereafter monitors the PDCCH.

Unlike the PDCCH, the PCFICH is transmitted by using a fixed PCFICH resource of the subframe, without having to perform blind decoding.

The PHICH carries a positive-acknowledgement (ACK)/ negative-acknowledgement (NACK) signal for an uplink hybrid automatic repeat request (HARQ). The ACK/NACK signal for uplink (UL) data on a PUSCH transmitted by the UE is transmitted on the PHICH.

A physical broadcast channel (PBCH) is transmitted in first four OFDM symbols in a 2nd slot of a 1st subframe of a radio frame. The PBCH carries system information necessary for communication between the UE and the BS. The system information transmitted through the PBCH is referred to as a master information block (MIB). In comparison thereto, system information transmitted on the PDCCH indicated by the PDCCH is referred to as a system information block (SIB).

Control information transmitted through the PDCCH is referred to as downlink control information (DCI). The DCI may include resource allocation of the PDSCH (this is referred to as a downlink (DL) grant), resource allocation of a PUSCH (this is referred to as an uplink (UL) grant), a set of transmit power control commands for individual UEs in any UE group, and/or activation of a voice over Internet protocol (VoIP).

The 3GPP LTE uses blind decoding for PDCCH detection. The blind decoding is a scheme in which a desired identifier is de-masked from a cyclic redundancy check (CRC) of a received PDCCH (referred to as a candidate PDCCH) to determine whether the PDCCH is its own control channel by performing CRC error checking.

The BS determines a PDCCH format according to DCI to be transmitted to the UE, attaches a CRC to the DCI, and masks a unique identifier (referred to as a radio network temporary identifier (RNTI)) to the CRC according to an owner or usage of the PDCCH.

To reduce a burden due to a blind decoding, 3GPP LTE uses a search space. The search space may be a CCE monitoring set for the PDCCH. A wireless device can monitor a PDCCH in the search space. The search space can be classified into a common search space (CSS) and a UE-specific search space (USS).

In 3GPP LTE, uplink channels include a physical uplink control channel (PUCCH) and a physical uplink shared channel (PUSCH).

Now, an HARQ performed in 3GPP LTE is described.

At present, in the 3GPP LTE, a DL HARQ uses an asynchronous HARQ mechanism, and a UL HARQ uses a synchronous HARQ mechanism.

When a PUSCH is transmitted in a subframe n, the following timing needs to be considered in the UL HARQ.

(1) k: a subframe n−k in which a PDCCH for carrying a UL grant for scheduling of the PUSCH is transmitted.

(2) j: a subframe n+j in which a PHICH for carrying ACK/NACK corresponding to the PUSCH is transmitted.

(3) r: a subframe n+j+r in which a retransmission PUSCH corresponding to the PHICH is transmitted.

Figure 2:
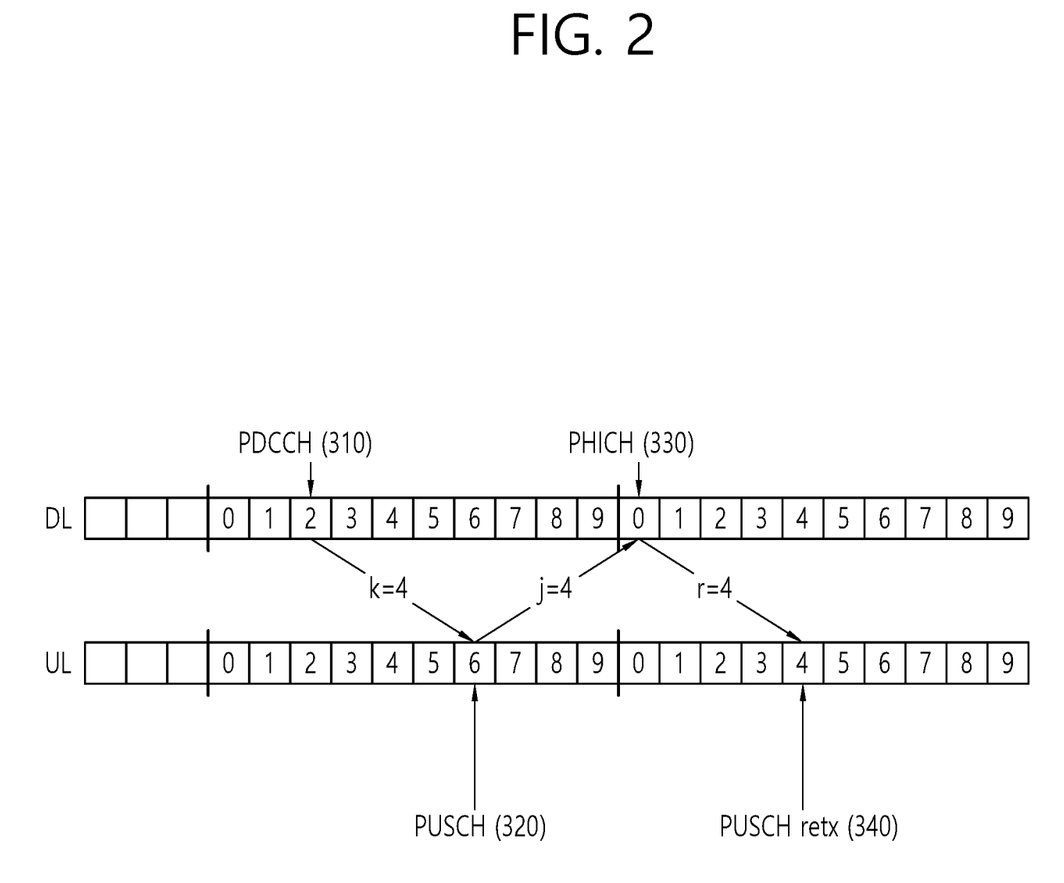
FIG. 2 shows an example of performing an uplink (UL) hybrid automatic repeat request (HARQ) in frequency division duplex (FDD).

FIG. 2 shows an example of performing a UL HARQ in FDD.

A wireless device receives a UL grant on a PDCCH 310 in a DL subframe n−k. The wireless device transmits a UL transport block in a subframe n on a PUSCH 320 indicated by the UL grant.

The wireless device receives an ACK/NACK signal for the UL transport block on a PHICH 330 in a subframe n+j. The ACK/NACK signal may be a reception acknowledgement for the UL transport block. The ACK/NACK signal becomes an ACK signal when the UL transport block is successfully decoded, and becomes an NACK signal when the DL transmission block fails in decoding. When the NACK signal is received, a BS may retransmit the DL transport block until the ACK signal is received or by up to the maximum number of retransmission attempts.

If the ACK/NACK signal is NACK, the wireless device performs retransmission on the PUSCH in a subframe n+j+r.

In FDD, a timing interval for transport block→ACK/NACK→retransmission is constant as 4 subframes. That is, k=j=r=4.

Figure 3:
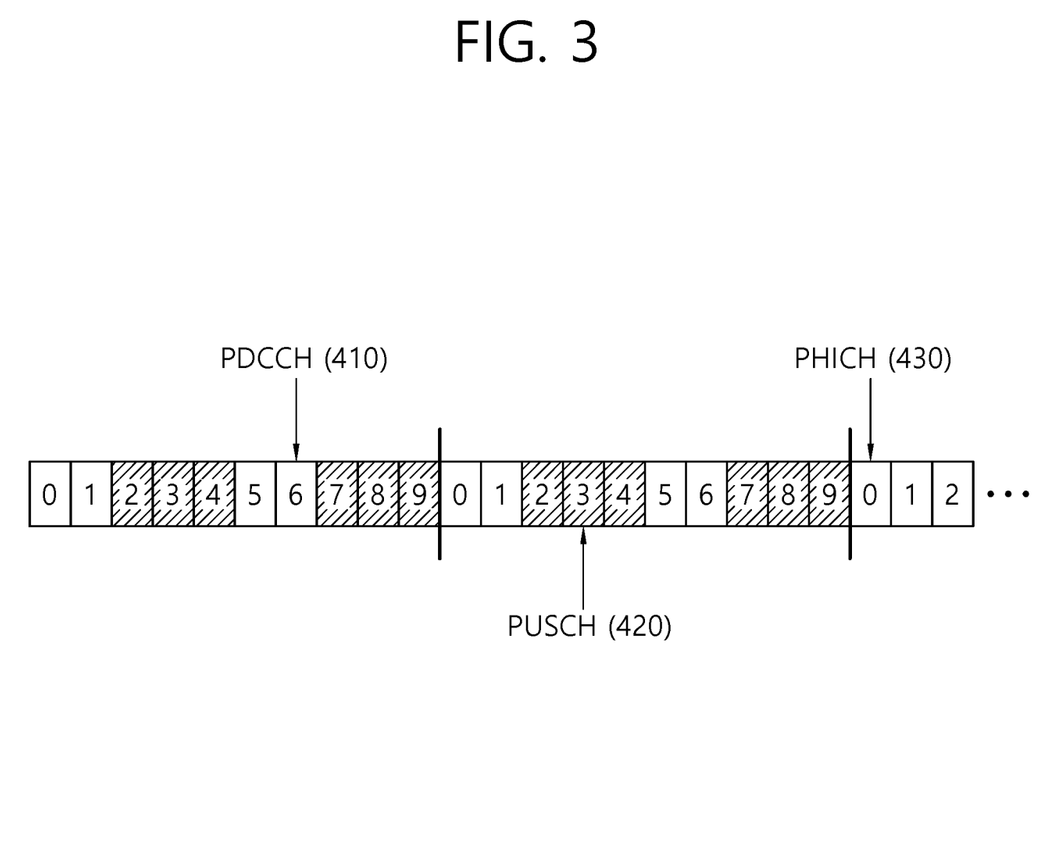
FIG. 3 shows an example of performing a UL HARQ in time division duplex (TDD).

FIG. 3 shows an example of performing a UL HARQ in TDD.

In case of TDD, a DL subframe and a UL subframe are selected according to a UL-DL configuration of Table 1, and there is a case where a ratio thereof is not matched to 1:1. Therefore, k, j, and r are not fixed.

The following table shows k for a subframe n−k in which a PDCCH corresponding to a PUSCH of a subframe n is transmitted in 3GPP LTE.

TABLE 2

| UL-DL config- | subframe n | | | | | | | | | |
|---|---|---|---|---|---|---|---|---|---|---|
| uration | 0 | 1 | 2 | 3 | 4 | 5 | 6 | 7 | 8 | 9 |
| 0 | — | — | 7/6 | 7 | 4 | — | — | 7/6 | 7 | 4 |
| 1 | — | — | 6 | 4 | — | — | — | 6 | 4 | — |
| 2 | — | — | 4 | — | — | — | — | 4 | — | — |

TABLE 2-continued

| UL-DL config- | subframe n | | | | | | | | | |
|---|---|---|---|---|---|---|---|---|---|---|
| uration | 0 | 1 | 2 | 3 | 4 | 5 | 6 | 7 | 8 | 9 |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

FIG. 3 shows a case where a UL-DL configuration corresponds to 0, and n=3. A PDCCH 410 having a UL grant is received in a subframe n−k, and a PUSCH 420 is transmitted in a subframe n. ACK/NACK is received on a PHICH 430 in a subframe n+r.

Figure 4:
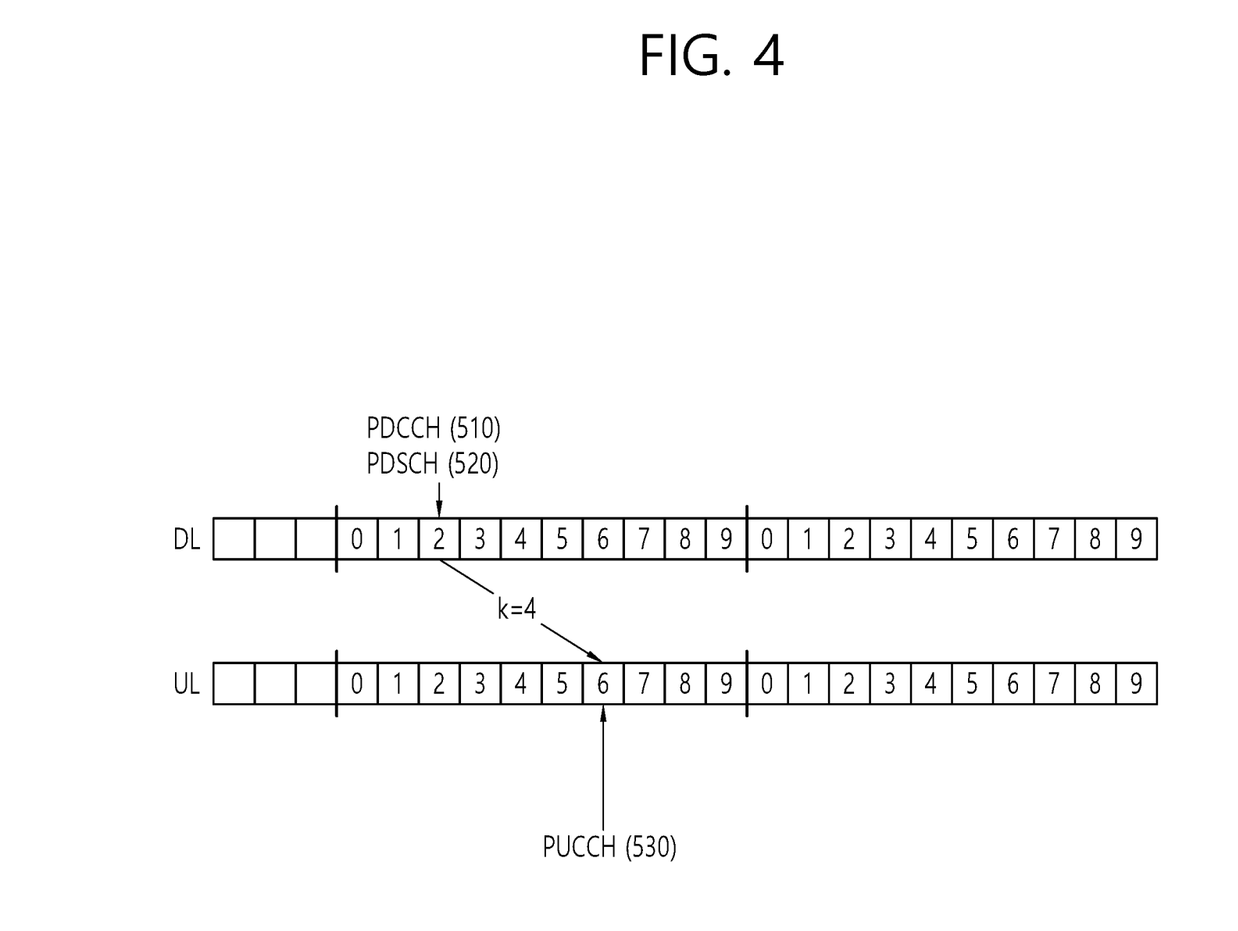
FIG. 4 shows an example of performing a downlink (DL) HARQ in FDD.

FIG. 4 shows an example of performing a DL HARQ in FDD.

In the DL HARQ, there is a need to define a timing between a subframe n−k in which a PDCCH for carrying a DL grant for scheduling of the PDSCH is detected and a subframe n in which corresponding ACK/NACK is transmitted.

In FDD, it is fixed as n=4. For example, if a PDCCH 510 and a PDSCH 520 corresponding thereto are detected in a subframe 2, ACK/NACK is transmitted through a PUCCH 530 in a subframe 6.

In TDD, when PDSCH transmission is detected in a subframe n−k (k∈K), ACK/NACK for a corresponding transport block(s) is transmitted in a subframe n. K is defined as shown in the following table.

TABLE 3

| UL-DL config- | subframe n | | | | | | | | | |
|---|---|---|---|---|---|---|---|---|---|---|
| uration | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Under a network environment in which carrier aggregation (CA) is supported, a wireless device may be configured of not only a time division duplex (TDD) cell-TDD cell or a frequency division duplex (FDD) cell-FDD cell but also a TDD cell-FDD cell. The TDD cell is a cell in which TDD is configured, and the FDD cell is a cell in which FDD is configured. When multiple duplex schemes are applied to the wireless device, it is called TDD-FDD CA for convenience. Accordingly, a DL/UL peak throughput can be significantly improved.

The carrier aggregation may support cross-carrier scheduling or non cross-carrier scheduling. In the cross-carrier scheduling, a scheduling cell and a scheduled cell are different. The scheduling cell is a cell for monitoring and receiving a DL control channel (e.g., PDSCH), and the scheduled cell is a cell for receiving or transmitting a PDSCH/PUSCH scheduled by the DL control channel. When the cross carrier scheduling is configured, DL control information in the DL control channel may include a DL/UL grant and a carrier indicator field (CIF) indicating the scheduled cell. In the non cross-carrier scheduling, the scheduling cell and the scheduled cell are identical.

In 3GPP LTE, only the same frame structure type cell can be aggregated. Further, if a plurality of TDD cells are aggregated, only the same configuration is used among the UL-DL configurations of Table 1. If the aggregated cells use the same UL-DL configuration or uses the non cross-carrier scheduling, the synchronous HARQ-type resource allocation and retransmission timing interval used in the conventional TDD may also be applied without alteration.

However, if TDD-FDD CA is supported, ACK/NACK corresponding to a PDSCH of an FDD secondary cell needs to be transmitted to a TDD primary cell, and in this case, the conventional timing fixed to k=j=r=4 may not be applied. This is because a subframe for transmitting the ACK/NACK may be a UL subframe or a DL frame according to a UL-DL configuration. Accordingly, there is a need to design a new UL/DL HARQ timing for the TDD-FDD CA.

The HARQ timing to be considered is summarized below.

1) A DL HARQ timing (PDSCH to ACK/NACK) for a TDD secondary cell in case of an FDD primary cell 1-1) Non-cross carrier scheduling: Follow a DL HARQ timing of the FDD primary cell.

1-2) Cross-carrier scheduling: Follow a DL HARQ timing of the FDD primary cell.

2) A UL HARQ timing (UL grant to PUSCH, PUSCH to PHICH) of a TDD secondary cell in case of an FDD primary cell 2-1) Non-cross carrier scheduling: Follow a UL HARQ timing of a scheduled TDD cell.

2-2) Cross-carrier scheduling 2-2-option A) If a scheduling cell is an FDD cell, follow a UL HARQ timing of a scheduled TDD cell. If the scheduling cell is a TDD cell, a reference UL-DL configuration for the UL HARQ timing is derived by the conventional UL-DL configuration of the scheduling cell and the scheduled cell.

2-2-option B) If a scheduling cell is an FDD cell, a UL HARQ timing is fixed (e.g., UL grant to PUSCH is 4 ms, and PUSCH to PHICH is 6 ms). If the scheduling cell is a TDD cell, a reference UL-DL configuration for a UL HARQ timing is derived by the conventional UL-DL configuration of the scheduling cell and a scheduled cell.

3) A DL-HARQ timing of an FDD secondary cell (PDSCH to ACK/NACK) in case of a TDD primary cell 3-1) Non-cross carrier scheduling 3-1-option A) A DL HARQ timing of a TDD primary cell based on the conventional UL-DL configuration or a new HARQ timing.

3-1-option B) Follow a reference UL-DL configuration for the FDD secondary cell. The reference UL-DL configuration may be derived by a UL-DL configuration of the TDD primary cell.

3-2) Cross-carrier scheduling: A timing of the TDD primary cell. Follow the 3-1-option A or the 3-1-option B.

4) A UL HARQ timing of an FDD secondary cell (UL grant to PUSCH, PUSCH to PHICH) in case of a TDD primary cell 4-1) Non-cross carrier scheduling: Follow a timing of the FDD secondary cell.

4-2) Cross-carrier scheduling 4-2-option A) If a scheduling cell is a TDD cell, follow a UL HARQ timing of an FDD cell. If the scheduling cell is the FDD cell, follow the UL HARQ timing of the FDD cell.

4-2-option B) If a scheduling cell is a TDD cell, a UL HARQ timing is fixed (e.g., UL grant to PUSCH is 4 ms, and PUSCH to PHICH is 6 ms). If the scheduling cell is an FDD cell, follow a UL HARQ timing of the FDD cell.

An example of the HARQ timing for the 3-1-option A is shown in the following table. Herein, K denotes a subframe n−k (k∈K) in which a PDSCH corresponding to ACK/NACK of a subframe n is transmitted. The UL-DL configuration corresponds to the UL-DL configuration of Table 1, and [ ] denotes a newly defined timing.

TABLE 4

| UL-DL Conf. | subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6, [5] | [5], [4] | 4 | — | — | 6, [5] | [5], [4] | 4 |
| 1 | — | — | 7, 6 | [6], [5], 4 | — | — | — | 7, 6 | [6], [5], 4 | — |
| 2 | — | — | 8, 7, 6, [5], 4 | — | — | — | — | 8, 7, 6, [5], 4 | — | — |
| 3 | — | — | 11, [10], [9], [8], 7, 6 | 6, 5 | 5, 4 | — | — | — | — | — |
| 4 | — | — | 12, 11, [10], [9], 8, 7 | 7, 6, 5, 4 | — | — | — | — | — | — |
| 5 | — | — | 13, 12, 11, [10], 9, 8, 7, 6, 5, 4 | — | — | — | — | — | — | — |
| 6 | — | — | [8], 7 | 7, [6] | [6], 5 | — | — | 7 | 7, [6], [5] | — |

The following tables show an example of a reference UL-DL configuration applicable to the FDD secondary cell of the 3-1-option B.

TABLE 5

| UL-DL configuration of TDD primary cell | allowed reference UL-DL configuration of FDD secondary cell |
|---|---|
| 0 | {0, 1, 2, 3, 4, 5, 6} |
| 1 | {1, 2, 4, 5} |
| 2 | {2, 5} |
| 3 | {3, 4, 5} |
| 4 | {4, 5} |
| 5 | {5} |
| 6 | {1, 2, 3, 4, 5, 6} |

TABLE 6

| UL-DL configuration of TDD primary cell | allowed reference UL-DL configuration of FDD secondary cell |
|---|---|
| 0 | {2, 4, 5} |
| 1 | {2, 4, 5} |
| 2 | {2, 5} |
| 3 | {4, 5} |
| 4 | {4, 5} |
| 5 | {5} |
| 6 | {2, 4, 5} |

TABLE 7

| UL-DL configuration of TDD primary cell | allowed reference UL-DL configuration of FDD secondary cell (2 serving cells) | allowed reference UL-DL configuration of FDD secondary cell (more than 2 serving cells) |
|---|---|---|
| 0 | 5 | 2 |
| 1 | 5 | 2 |
| 2 | 5 | 2 |
| 3 | 5 | 4 |
| 4 | 5 | 4 |
| 5 | 5 | not applicable |
| 6 | 5 | 2 |

An enhanced interference mitigation and traffic adaptation (eIMTA) is a method of effectively improving traffic loads and interference mitigation by dynamically changing a UL-DL configuration in TDD.

In general, in a TDD cell, a UL-DL configuration is fixed through system information (this is called a fixed UL-DL configuration). However, the UL-DL configuration may be flexibly changed to effectively use a UL-DL resource according to a UL-DL traffic situation which changes over time. In particular, the UL-DL configuration may be changed dynamically through a control channel (e.g., PDCCH) (this is called a dynamic UL-DL configuration). The dynamic UL-DL configuration may be achieved in such a manner that the conventional UL-DL configuration is changed in unit of radio frames. In this case, even if the dynamic UL-DL configuration is given, a UL-DL configuration which is used as a reference of an HARQ timing (this is called a reference UL-DL configuration) may be designated for a corresponding cell through an RRC message or the like to maintain the HARQ timing. In particular, according to the fixed UL-DL configuration, the reference UL-DL configuration may be utilized when a subframe which is a UL subframe is changed to a DL subframe. For example, if the reference UL-DL configuration is configured as a UL-DL configuration 1 in a state where the fixed UL-DL configuration is configured as a UL-DL configuration 0, among subframes {2, 3, 4, 7, 8, 9} which are originally UL subframes, subframes {4, 9} may be utilized as a DL subframe, and thus a DL HARQ timing may be defined in the subframes {4, 9}.

Hereinafter, it is assumed that the reference UL-DL configuration is given through the RRC message, and the dynamic UL-DL configuration is given through the DCI on the PDCCH. In the reference UL-DL configuration, if a subframe which is a UL subframe can be changed to a DL subframe through the dynamic UL-DL configuration, the DL subframe in the dynamic UL-DL configuration may be a subset of a DL subframe set in the reference UL-DL configuration. Further, in the fixed UL-DL configuration, the DL subframe may be a subset of the DL subframe set in the reference UL-DL configuration.

The reference UL-DL configuration does not indicate an actual UL-DL usage, and may be used to define an HARQ timing. Therefore, a DL subframe defined according to the reference UL-DL configuration in a UL carrier is not used as an actual DL subframe.

The dynamic UL-DL configuration may be applied after a subframe in which a PDCCH having the dynamic UL-DL configuration is detected.

The aforementioned eIMTA method may be applied to the UL carrier of the FDD cell so that some subframes of the UL carrier can be used as a DL subframe.

Figure 5:
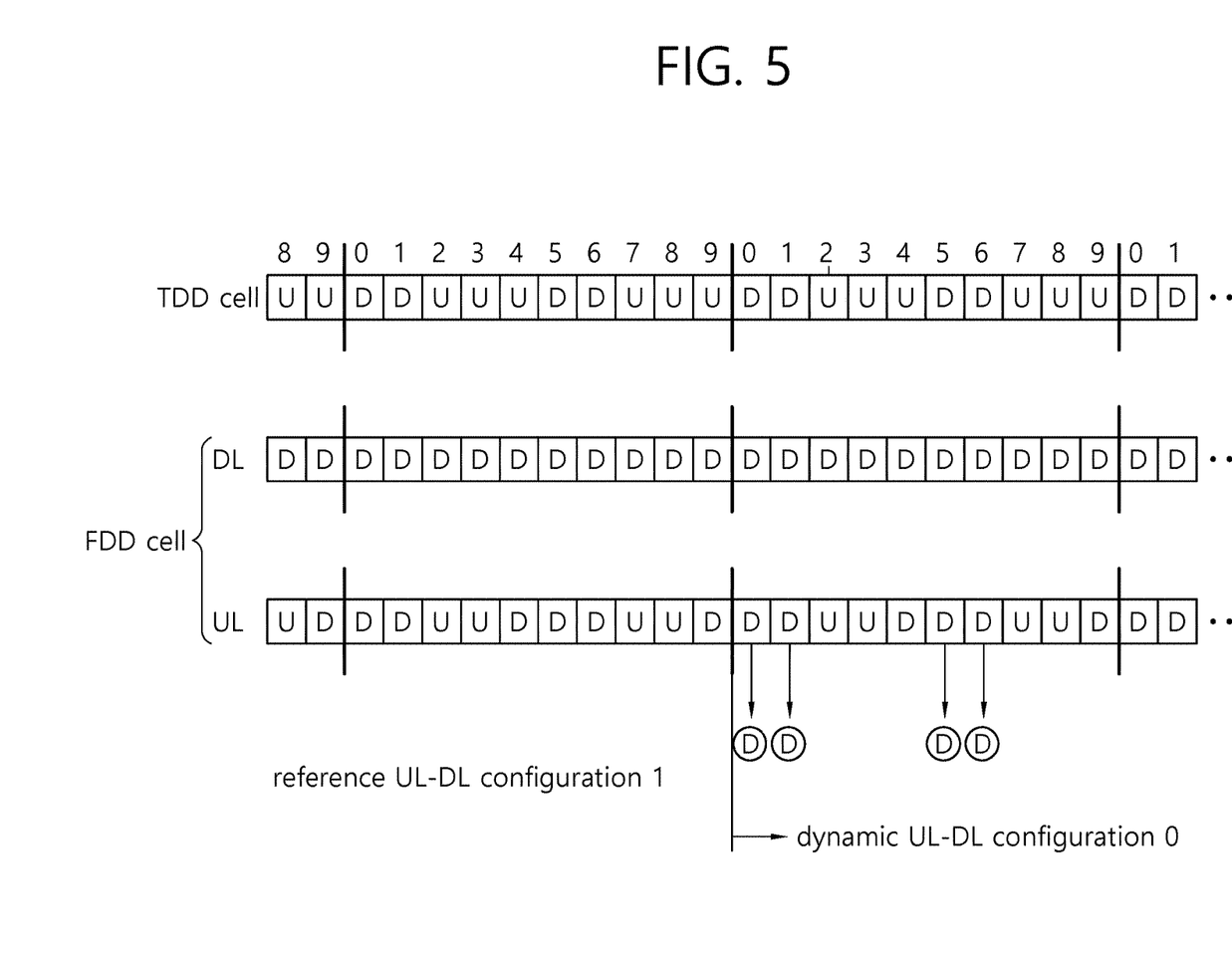
FIG. 5 shows an example of applying a change of a UL-DL configuration to a UL carrier of an FDD cell.

FIG. 5 shows an example of applying a change of a UL-DL configuration to a UL carrier of an FDD cell.

A TDD primary cell and an FDD secondary cell are assumed. It is assumed that the TDD primary cell has a UL-DL configuration 0 as a fixed UL-DL configuration.

A reference UL-DL configuration may be given for a UL carrier so that DL traffic can be transmitted not only in the DL carrier of the FDD cell but also in the UL carrier. For example, if it is assumed that a UL-DL configuration 1 is given as the reference UL-DL configuration through an RRC message, subframes {0, 1, 4, 5, 6, 9} may be utilized as a DL subframe, and a DL HARQ timing is determined according to the UL-DL configuration 1. In this case, it is assumed that the UL-DL configuration 0 is given as a dynamic UL-DL configuration from a specific radio frame. Accordingly, subframes {0, 1, 5, 6} may be utilized as an actual DL subframe.

Hereinafter, it is proposed a method of determining an HARQ timing in an FDD cell alone when a reference UL-DL configuration and a dynamic UL-DL configuration are applied to a UL carrier of an FDD cell and an HARQ timing when the FDD cell and an FDD/TDD cell are aggregated.

It is proposed that, when a DL subframe is utilized as a UL subframe or the UL subframe is utilized as the DL subframe through a reference/dynamic UL-DL configuration for a DL or UL carrier of an FDD cell, a corresponding carrier is regarded as a TDD cell based on a corresponding UL-DL configuration, and a resultant HARQ timing is applied. In particular, it is proposed that, in a method of utilizing a UL subframe as a DL subframe through a reference/dynamic UL-DL configuration for a UL carrier of an FDD cell, a DL carrier and UL carrier of the FDD cell are regarded as that an FDD cell operating only with the DL carrier and a TDD cell based on the reference UL-DL configuration are aggregated, and a resultant HARQ timing is applied.

A detailed example of this method is as follows.

I) In case of applying a UL-DL configuration to an FDD UL carrier in the presence of an FDD cell alone without CA I-1) If a DL carrier is scheduled by a DL carrier, and a UL carrier is scheduled by a UL carrier: A DL HARQ timing of an FDD DL carrier follows a DL HARQ timing of an FDD secondary cell when a TDD primary cell having a reference UL-DL configuration of the FDD UL carrier is aggregated with the FDD secondary cell. That is, follow the method 3-1 for the case of the TDD-FDD aggregation.

I-2) If a PDSCH of a DL carrier is scheduled by a UL carrier of a PDSCH, or a UL carrier is scheduled by a DL carrier: A DL HARQ timing of an FDD DL carrier follows a DL HARQ timing of an FDD secondary cell when a TDD primary cell having a reference UL-DL configuration of an FDD UL carrier is aggregated with the FDD secondary cell. That is, follow the method 3-2 for the case of the TDD-FDD aggregation.

II) In case of applying a UL-DL configuration to a UL carrier of an FDD primary cell in the presence of the FDD primary cell and an FDD secondary cell II-1) Non-cross carrier scheduling: A DL HARQ timing of an FDD secondary cell follows a DL HARQ timing of the FDD secondary cell when a TDD primary cell having a reference UL-D configuration of a UL carrier is aggregated with the FDD secondary cell. That is, follow the method 3-1 for the case of the TDD-FDD aggregation.

II-2) Cross-carrier scheduling: A DL HARQ timing of an FDD secondary cell follows a DL HARQ timing of the FDD secondary cell when a TDD primary cell having a UL-DL configuration of a UL carrier of an FDD primary cell is aggregated with the FDD secondary cell. That is, follow the method 3-2 for the case of the TDD-FDD aggregation.

III) In case of applying a UL-DL configuration to a UL carrier of an FDD primary cell in the presence of the FDD primary cell and a TDD secondary cell III-1) Non-cross carrier scheduling: A DL-HARQ timing of a TDD secondary cell follows a DL HARQ timing corresponding to a reference UL-DL configuration derived by combining a reference UL-DL configuration of a UL carrier of an FDD primary cell and a reference UL-DL configuration of the TDD secondary cell. An example of the reference UL-DL configuration derived in this case is as shown in the following table.

TABLE 8

| HARQ timing | UL-DL configuration of primary cell | | | | | | |
|---|---|---|---|---|---|---|---|
| | 0 | 1 | 2 | 3 | 4 | 5 | 6 |
| UL-DL configuration of secondary cell | | | | | | | |
| 0 | 0 | 1 | 2 | 3 | 4 | 5 | 6 |
| 1 | 1 | 1 | 2 | 4 | 4 | 5 | 1 |
| 2 | 2 | 2 | 2 | 5 | 5 | 5 | 2 |
| 3 | 3 | 4 | 5 | 3 | 4 | 5 | 3 |
| 4 | 4 | 4 | 5 | 4 | 4 | 5 | 4 |
| 5 | 5 | 5 | 5 | 5 | 5 | 5 | 5 |
| 6 | 6 | 1 | 2 | 3 | 4 | 5 | 6 |

III-2) Cross-carrier scheduling: A DL HARQ timing of a TDD secondary cell follows the method III-1 or is determined on the basis of a reference UL-DL configuration of a UL carrier of an FDD primary cell.

IV) In case of applying a UL-DL configuration to a UL carrier of an FDD secondary cell in the presence of a TDD primary cell and an FDD secondary cell IV-1) Non-cross carrier scheduling A DL HARQ timing of a UL carrier of the FDD secondary cell is determined as shown in the method III-1 on the basis of a fixed/reference UL-DL configuration of the TDD primary cell and a reference UL-DL configuration of the UL carrier of the FDD secondary cell. An example of the HARQ timing is as shown in Table 8 above.

If the UL-DL configuration of the UL carrier of the FDD secondary cell is given in unit of radio frames, that is, if all subframes in one radio frame are configured as a DL subframe, a DL HARQ timing of the UL carrier of the FDD secondary cell may follow the fixed/reference UL-DL configuration of the TDD primary cell. Alternatively, the DL HARQ timing of the UL carrier of the FDD secondary cell may follow an HARQ timing determined as shown in the method 3-1 on the basis of the fixed/reference UL-DL configuration of the TDD primary cell.

IV-2) Cross-carrier scheduling: The DL HARQ timing of the UL carrier of the FDD secondary cell follows the method IV-1 or is determined on the basis of the fixed/reference UL-DL configuration of the TDD primary cell.

V) In case of applying a UL-DL configuration to a UL carrier of an FDD primary cell and a UL carrier of an FDD secondary cell in the presence of the FDD primary cell and the FDD secondary cell V-1) Non-cross carrier scheduling: A DL HARQ timing of the UL carrier of the FDD secondary cell is determined as shown in the method III-1 on the basis of a reference UL-DL configuration of the UL carrier of the FDD primary cell and a reference UL-DL configuration of the UL carrier of the FDD secondary cell.

V-2) Cross-carrier scheduling: The DL HARQ timing of the UL carrier of the FDD secondary cell follows the method V-1 or is determined on the basis of the reference UL-DL configuration of the UL carrier of the FDD primary cell.

VI) In case of applying a UL-DL configuration to a ULD carrier of an FDD secondary cell in the presence of an FDD primary cell and the FDD secondary cell VI-1) Non-cross carrier scheduling: A DL HARQ timing of the UL carrier of the FDD secondary cell follows a fixed HARQ timing (e.g., 4 ms) of the FDD primary cell.

VI-2) Cross-carrier scheduling: A DL HARQ timing of the UL carrier of the FDD secondary cell follows a fixed HARQ timing (e.g., 4 ms) of the FDD primary cell.

In the above example, ACK/NACK for a PDCCH/PDSCH transmitted through an FDD DL carrier and a PDCCH/PDSCH transmitted through an FDD UL carrier may be transmitted by using a PUCCH/PUSCH resource in one subframe in the FDD UL carrier.

Figure 6:
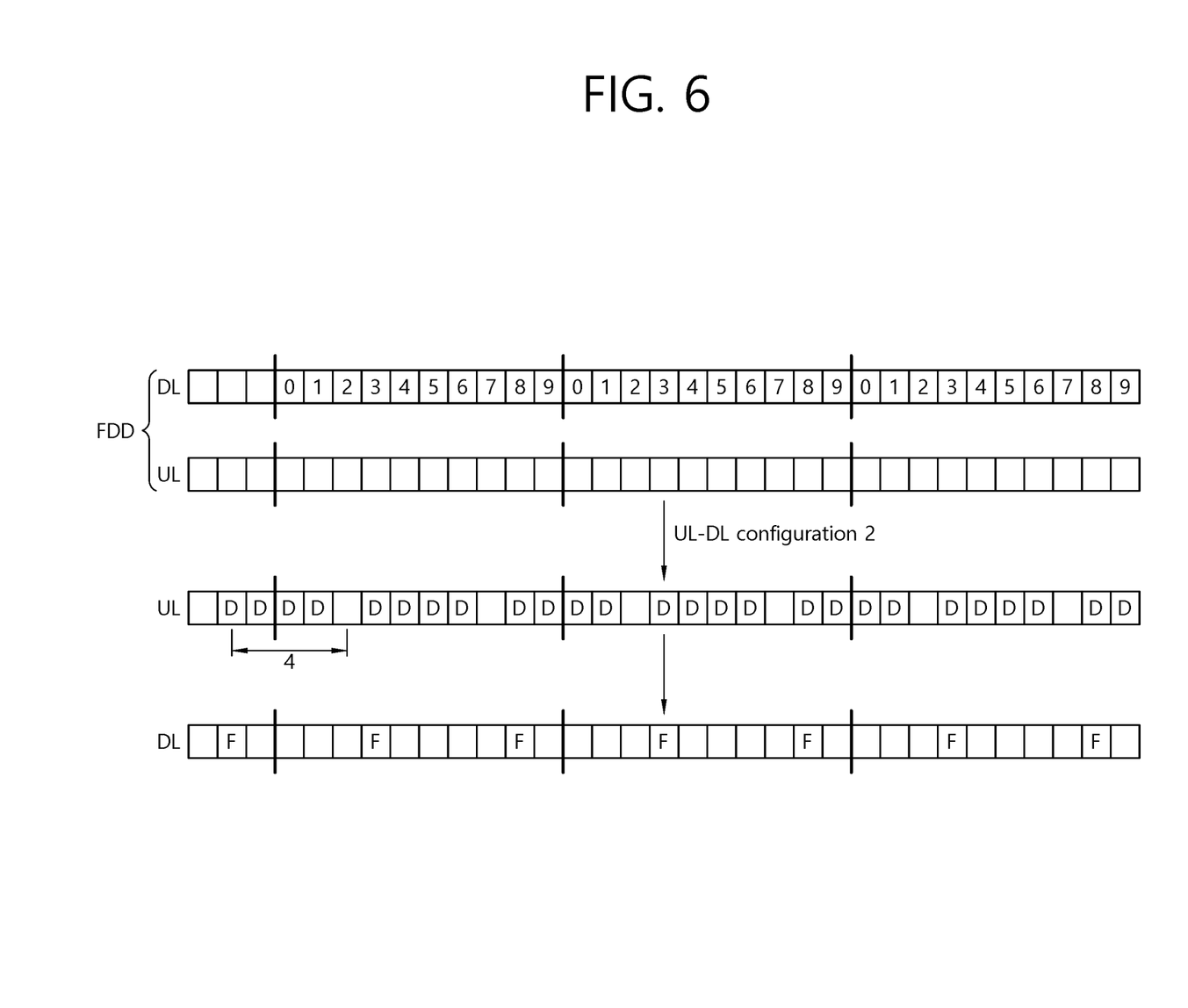
FIG. 6 shows an example of applying an HARQ timing.

FIG. 6 shows an example of applying an HARQ timing. This is a more specific embodiment for a case where a specific interval (e.g., 4 ms or 4 subframes) is applied as an ACK/NACK timing for a PDSCH when a reference/dynamic UL-DL configuration is applied to an FDD UL carrier.

In order to use a UL subframe in a UL carrier of an FDD cell as a DL subframe in a dedicated manner, an ACK/NACK response for a PDSCH must be available. For example, it is assumed that a 4 ms DL HARQ timing is applied. In UL-DL configurations 0, 1, and 6, a UL subframe satisfying this timing are subframes 2 and 7. This is not much different from a case where the UL-DL configuration of the UL carrier is set to the UL-DL configuration 2. Therefore, a UL-DL configuration allowed to the UL carrier may be limited to {2, 3, 4, 5}. This is for exemplary purposes only, and thus allowed UL-DL configurations may be limited variously, for example, to {0, 1, 2, 4, 6}, {3, 5}, {0, 1, 2, 6}, {3, 4, 5}.

As to a UL subframe n, a subframe n−4 is a subframe that can be dedicatedly used as a DL subframe. For example, if subframes 2 and 7 are a UL subframe, a subframe 8 corresponding to the UL subframe 2 and a subframe 3 corresponding to the UL subframe 7 may be dedicatedly used as a DL subframe. That is, the subframes 3 and 8 are a flexible subframe (indicated by 'F' in FIG. 5) configurable as UL or DL. If an HARQ timing of a UL carrier is determined by considering the flexible subframe, an ACK/ NACK payload may be easily configured.

Meanwhile, if a UL carrier of an FDD cell is configured as a reference UL-DL configuration or a dynamic UL-DL configuration, a DL subframe of the UL carrier may be significantly interfered due to UL transmission of a neighboring FDD cell. In particular, a channel such as a PDCCH for transmitting scheduling information or other control information may be much influenced by this interference. Therefore, the following method is proposed to decrease an influence caused by the interference.

Method 1-1) A PDSCH transmitted in a DL subframe of a UL carrier of an FDD cell is scheduled by a PDCCH of another cell or a PDCCH of a DL carrier of the FDD cell. That is, the PDSCH transmitted in the DL subframe of the UL carrier of the FDD cell is not scheduled by the PDCCH of the UL carrier. The PDCCH and/or the control channel may not be transmitted in the DL subframe of the UL carrier of the FDD cell. A wireless device may not monitor the PDCCH and/or the control channel in the DL subframe of the UL carrier of the FDD cell.

Method 1-2) A PDCCH transmitted in a DL subframe of a UL carrier of an FDD cell may not be able to schedule a PUSCH of a UL carrier of the FDD cell or a PUSCH of a UL carrier of the FDD cell or a PDSCH/PUSCH for another cell.

Likewise, a TDD cell may also be significantly interfered due to UL/DL transmission of a neighboring TDD cell if it is configured as a reference UL-DL configuration or a dynamic UL-DL configuration. Therefore, the following method is proposed to decrease an influence caused by the interference.

Method 2-1) A PDSCH of a TDD cell configured by a reference UL-DL configuration or a dynamic UL-DL configuration is scheduled by cross-carrier scheduling. The PDSCH of the TDD cell is scheduled by a PDCCH of another cell.

Method 2-2) In a subframe which is a UL subframe according to a fixed UL-DL configuration but is changed to a DL subframe according to a reference/dynamic UL-DL configuration, a PDCCH for scheduling a PDSCH/PUSCH of another cell is not transmitted. A PDCCH for scheduling a PDSCH/PUSCH of a corresponding TDD cell is transmitted in the changed DL subframe. A wireless device does not expect to monitor the PDCCH for cross-carrier scheduling in the changed DL subframe.

Figure 7:
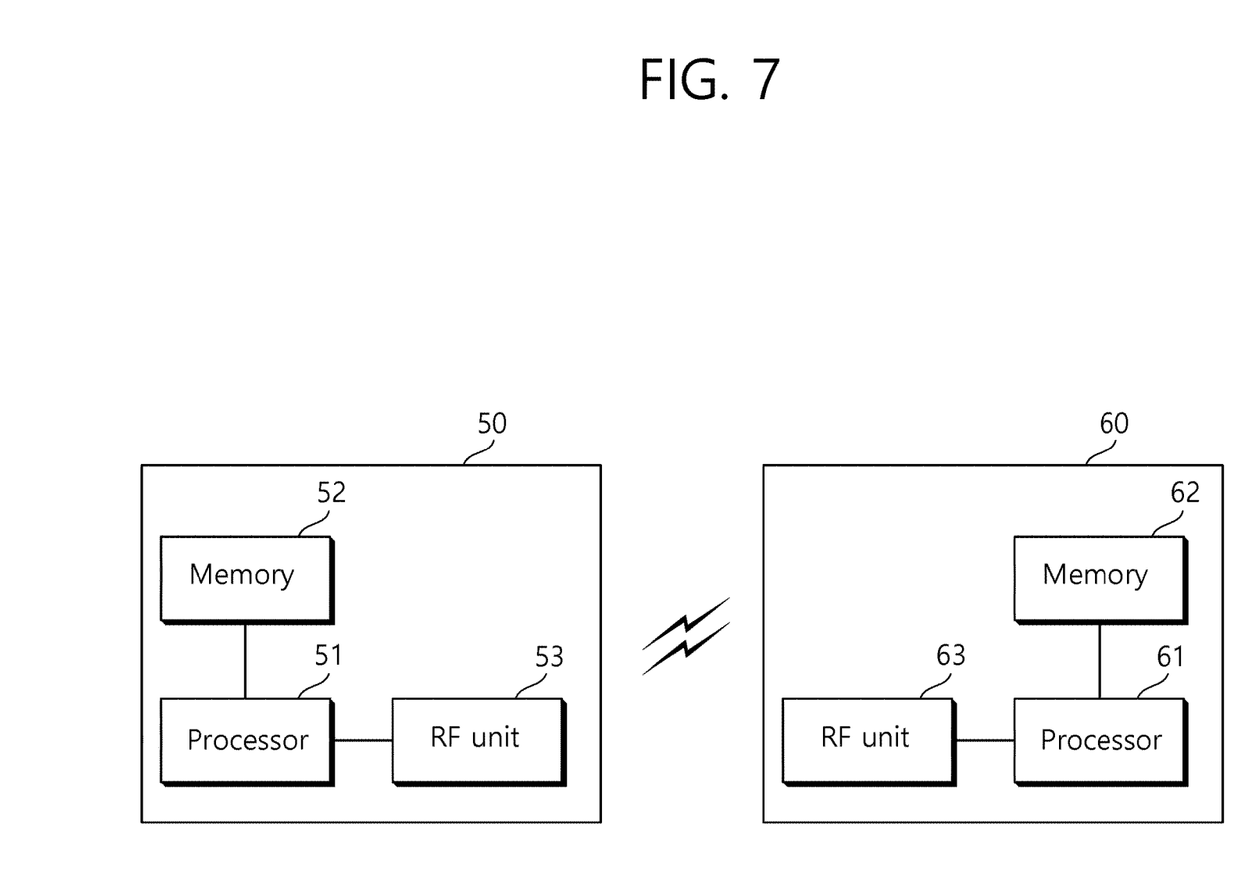
FIG. 7 is a block diagram showing a wireless communication system according to an embodiment of the present invention.

FIG. 7 is a block diagram showing a wireless communication system according to an embodiment of the present invention.

A BS 50 includes a processor 51, a memory 52, and a radio frequency (RF) unit 53. The memory 52 is coupled to the processor 51 to store a variety of information for driving the processor 51. The RF unit 53 is coupled to the processor 51 to transmit and/or receive a radio signal. The processor 51 implements the proposed functions, procedures, and/or methods. In the aforementioned embodiment, an operation of the BS or a cell may be implemented by the processor 51.

A wireless device 60 includes a processor 61, a memory 62, and an RF unit 63. The memory 62 is coupled to the processor 61 to store a variety of information for driving the processor 61. The RF unit 63 is coupled to the processor 61 to transmit and/or receive a radio signal. The processor 61 implements the proposed functions, procedures, and/or methods. In the aforementioned embodiment, an operation of the wireless device may be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for performing a hybrid automatic repeat request (HARQ) of a frequency division duplex (FDD) cell in a wireless communication system, the method comprising:
   receiving, by a wireless device, an uplink-downlink (UL-DL) configuration for a UL carrier of the FDD cell; and
   performing, by the wireless device, the HARQ in a DL carrier of the FDD cell based on an HARQ timing,
   wherein the HARQ timing is determined by the received UL-DL configuration,
   wherein a physical downlink shared channel (PDSCH) transmitted in a DL subframe of the UL carrier of the FDD cell is scheduled by a physical downlink control channel (PDCCH) of the DL carrier of the FDD cell,
   wherein the PDSCH transmitted in the DL subframe of the UL carrier of the FDD cell is not scheduled by the PDCCH of the UL carrier of the FDD cell, and
   wherein the PDCCH is not transmitted in the DL subframe of the UL carrier of the FDD cell.

2. The method of claim 1, wherein the performing of the HARQ comprises:
   receiving a DL transport block in a DL subframe n-k of the DL carrier of the FDD cell; and
   transmitting an ACK/NACK for the DL transport block in a UL subframe n of the UL carrier of the FDD cell,
   wherein the values n and k are integers satisfying n, k>=0, and
   wherein the value k is determined according to the UL-DL configuration.

3. The method of claim 2, wherein scheduling information for scheduling the DL transport block is received in the DL subframe n-k of the DL carrier of the FDD cell.

4. The method of claim 2, wherein scheduling information for scheduling the DL transport block is received in the DL subframe n-k of a serving cell.

5. The method of claim 4, wherein the serving cell is based on time division duplex (TDD) or FDD.

6. The method of claim 1, wherein the performing of the HARQ comprises:
receiving a DL transport block in a DL subframe n-k of a serving cell; and
transmitting ACK/NACK for the DL transport block in a UL subframe n of the UL carrier of the FDD cell,
wherein the values n and k are integers satisfying n, k>=0, and
wherein the value k is determined according to the UL-DL configuration.

7. The method of claim 6, wherein the FDD cell is a primary cell, and the serving cell is a secondary cell.

8. The method of claim 1, wherein the UL-DL configuration is received through a radio link resource (RRC) message.

9. The method of claim 1, wherein the UL-DL configuration contains information for designating some of a plurality of subframes of the UL carrier as a DL subframe and the remaining subframes as a UL subframe.

10. A device for performing a hybrid automatic repeat request (HARQ) in a wireless communication system, the device comprising:
a transceiver configured to transmit and receive a radio signal; and
a processor operatively coupled to the transceiver and configured to:
control the transceiver to receive an uplink-downlink (UL-DL) configuration for a UL carrier of a frequency division duplex (FDD) cell, and
perform the HARQ in a DL carrier of the FDD cell based on an HARQ timing,
wherein the HARQ timing is determined by the received UL-DL configuration,
wherein a physical downlink shared channel (PDSCH) transmitted in a DL subframe of the UL carrier of the FDD cell is scheduled by a physical downlink control channel (PDCCH) of the DL carrier of the FDD cell,
wherein the PDSCH transmitted in the DL subframe of the UL carrier of the FDD cell is not scheduled by the PDCCH of the UL carrier of the FDD cell, and
wherein the PDCCH is not transmitted in the DL subframe of the UL carrier of the FDD cell.

11. The device of claim 10, wherein the processor is configured to perform the HARQ by receiving a DL transport block in a DL subframe n-k of the DL carrier of the FDD cell, and by transmitting an ACK/NACK for the DL transport block in a UL subframe n of the UL carrier of the FDD cell,
wherein the values n and k are integers satisfying n, k>=0, and
wherein the value k is determined according to the UL-DL configuration.

12. The device of claim 11, wherein scheduling information for scheduling the DL transport block is received in the DL subframe n-k of the DL carrier of the FDD cell.

* * * * *